United States Patent [19]
Wiles

[11] 3,815,019
[45] June 4, 1974

[54] MICROWAVE LOW MOISTURE MEASURING APPARATUS

[75] Inventor: Sydney T. Wiles, Mississauga, Ontario, Canada

[73] Assignee: Electronic Associates of Canada Ltd., Downsview, Ontario, Canada

[22] Filed: Dec. 19, 1972

[21] Appl. No.: 316,456

[52] U.S. Cl............................................ 324/58.5 A
[51] Int. Cl............................................. G01r 27/04
[58] Field of Search........ 324/58.5 A, 58.5 B, 58 A, 324/58 B

[56] References Cited
UNITED STATES PATENTS

| | | | |
|---|---|---|---|
| 3,079,551 | 2/1963 | Walker | 324/58.5 A |
| 3,079,552 | 2/1963 | Walker | 324/58.5 A |
| 3,508,145 | 4/1970 | Reed et al. | 324/58.5 A |
| 3,553,573 | 1/1971 | Lundstrom et al. | 324/58.5 A |
| 3,715,667 | 2/1973 | Nicolson | 324/58.5 B |

*Primary Examiner*—Stanley T. Krawczewicz
*Attorney, Agent, or Firm*—Shenier & O'Connor

[57] ABSTRACT

Microwave apparatus for measuring the relatively low moisture content of a web such as that at the dry end of a papermaking machine in which a wave guide section comprising an elongated dielectric strip of material supported by conductive material and positioned in intimate contact with the web is supplied with a microwave signal so that a measurement of the resultant attenuation of the signal fed to one end of the guide section provides an accurate measure of the moisture content of the web.

12 Claims, 10 Drawing Figures

MICROWAVE LOW MOISTURE MEASURING APPARATUS

BACKGROUND OF THE INVENTION

There are known in the prior art systems for measuring moisture in webs such as the web passing through a papermaking machine, which systems make use of the fact that free water absorbs microwave energy as a result of molecular resonance. The greatest attenuation of micro-energy occurs when the exciting frequency is the natural resonant frequency of the molecules. For example, one absorption peak occurs in the band from 20 to 25 GHz.

More particularly, in the prior art a microwave signal is transmitted through the sheet or web of moisture containing material and means is provided for measuring the loss undergone by this signal following its passage through the sheet to provide a measure of moisture content. In an improved system, the microwave signal is caused to pass through the sheet twice, thus increasing the sensitivity of the apparatus.

While systems of the type described above function satisfactorily at a location at which the moisture content of the sheet is relatively great, such as at the wet end of a papermaking machine, they do not operate effectively at locations at which the moisture content of the sheet is relatively low. This results from the fact that the signal loss in passing through the sheet is determined by the sheet thickness. It can readily be demonstrated that the effectiveness of a system in which the signal is transmitted through the web cannot be increased merely by increasing the number of transmitting and corresponding receiving devices. For example, consider an arrangement of a number $n$ of transmitting antennae or horns supplied from the same source of microwave power $P$ and each adapted to direct its signal through a respective incremental area of the sheet. It will be clear that the power at each transmitting horn is $P/n$. Consider, moreover, an equal number of receiving horns, each associated with a respective transmitting horn so that it receives a signal only from its associated transmitting horn. If the loss $L$ experienced by the signal in passing from one of the transmitting horns to the associated receiving horn is $L$ the signal power level at each receiving horn will be $LP/n$. Where all of the receiving horns are connected to the same detector, the power level in the detector will be $n(LP/n)$ which is $LP$. It will thus be clear that the sensitivity of such a microwave moisture measuring equipment is independent of the number of transmitting and receiving devices. By the same reasoning, the sensitivity of microwave measuring equipment is independent of the radiation patterns of the transmitting devices.

I have invented a microwave low moisture measuring apparatus which overcomes the defects of microwave measuring apparatus of the prior art. My apparatus is especially adapted for use in measuring low moisture content such as that of the web at the dry end of a papermaking machine. A further object of my invention is to provide a microwave low moisture measuring apparatus which is more sensitive than are microwave moisture measuring systems of the prior art. The sensitivity of my microwave low moisture measuring apparatus is readily predetermined depending upon the application in which it is to be used.

SUMMARY OF THE INVENTION

One object of my invention is to provide a microwave low moisture measuring apparatus which is more sensitive than are microwave moisture measuring systems of the prior art.

Another object of my invention is to provide a microwave low moisture measuring apparatus which is especially adapted for use in measuring low moisture content such as that of the web at the dry end of a papermaking machine.

A further object of my invention is to provide a microwave low moisture measuring apparatus which is more sensitive than is microwave measuring apparatus of the prior art.

Yet another object of my invention is to provide a microwave low moisture measuring apparatus the sensitivity of which is readily predetermined for a particular installation.

A still further object of my invention is to provide a microwave low moisture measuring apparatus the operation of which is independent of the thickness of a web of moisture-containing material with which it is used.

Other and further objects of my invention will appear from the following description.

In general my invention contemplates the provision of a microwave low moisture measuring apparatus in which a microwave signal is applied to one end of an elongated wave guide section comprising a strip of dielectric material supported by conductive material and positioned in intimate contact with a moisture-containing web so that the attenuation of the microwave signal as it passes along the wave guide section is a measuring of the moisture content of the web.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 1:
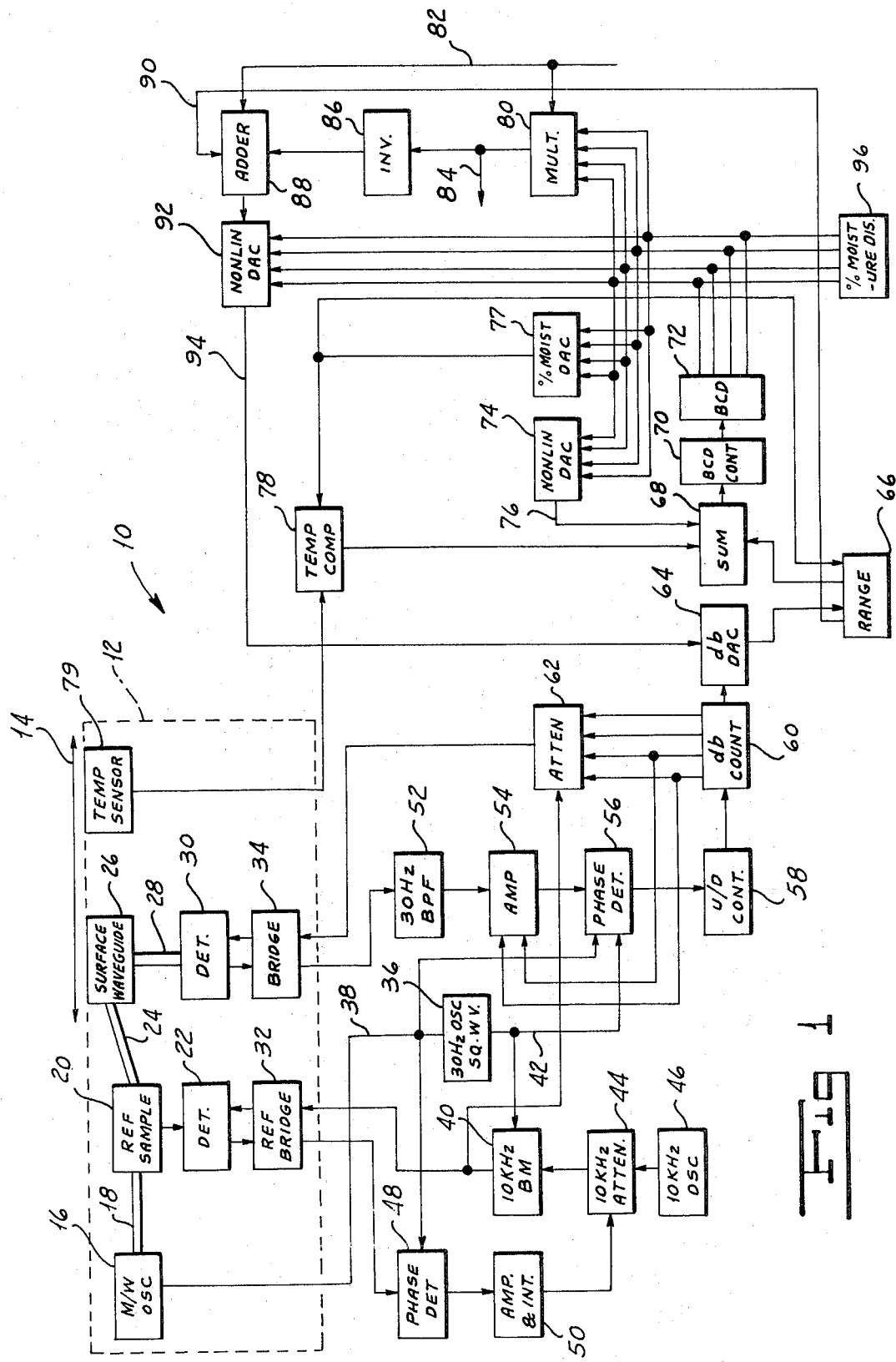
FIG. 1 is a block diagram of my microwave low moisture measuring apparatus.

Referring now to FIG. 1 of the drawings, my microwave low moisture measuring system, indicated generally by the reference character 10, includes a head, indicated by the broken line block 12, adapted to be positioned in operative relationship with a web 14, the moisture content of which is to be measured. The microwave portion of the apparatus contained in the head 12 includes a microwave oscillator 16 which may, for example, be a Gunn diode which puts out a signal having a frequency in the range of between 20 and 25 GHz. A wave guide section 18 feeds the signal from the oscillator 16 to a directional coupler 20 which feeds about 16 percent of the signal output from oscillator 16 to a detector 22 and which feeds the remaining 84 percent to a wave guide 24 which conducts the signal to a surface wave guide 26 to be described more fully hereinbelow. A wave guide section 28 conducts the output of the surface wave guide 26 to a detector 30.

Figure 10:
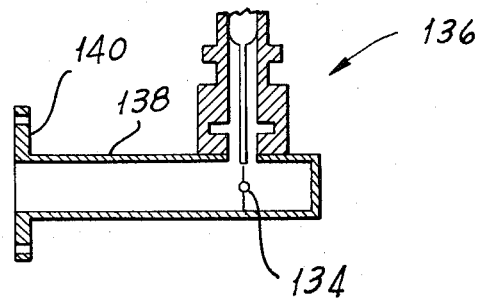
FIG. 10 is a sectional view illustrating one form of detector I may use in my microwave low moisture measuring equipment.

Each of the detectors 20 and 22 may be of any suitable type known to the art. Referring now to FIG. 10, preferably I employ a thermistor 134 which is mounted in a rectangular wave guide 138 equipped with a suitable flange 140 to permit connection to another wave guide and in such a way that it will absorb all of the microwave energy in the wave guide. A BNC connector, indicated generally by the reference character 136, permits connection to the external circuit. As is known in the art, a thermistor is merely a temperature-sensitive resistor having a negative temperature coefficient. In my system, as will be explained more fully hereinbelow, the thermistor detectors 22 and 30 are biased to make the nominal resistance of each 200 ohms.

Referring again to FIG. 1, my system includes respective bridges 32 and 34 for passing signals to and from the respective detectors 22 and 30. A 30 Hz oscillator 36 provides a square wave output signal on a channel 38 for actuating the microwave oscillator 16. The complement of the square wave appearing on a channel 42 is coupled to a 10 KHz burst modulator 40 the input of which is provided by an attenuator 44 fed by a 10 KHz oscillator 46. The output from detector 22 is fed through the bridge circuit 32 to phase a detector 48 the reference phase of which is provided by channel 38. The output of phase detector 48 is fed to an amplifier and integrating circuit 50 which controls the operation of the attenuator 44. This structure just described comprises the reference signal loop of my system.

This reference signal loop provides a measure of the difference in power between the microwave source and the 10 kHz signal. This measure, represented by the output of circuit 50 controls the 10 KHz attenuator so that its power is the same as that supplied by source 16. The bridge 32 supplies the amount of d.c. necessary to make up the difference between heat supplied by the ambient and by either the source 16 or modulator 40 to keep the resistance of the termistor 134 constant. That is, the bridge supplies sufficient d.c. to maintain thermistor 134 at such a temperature that its resistance is always 200 ohms. The output of modulator 40 is fed to the sensing loop to be described so that the system is independent of ambient temperature and of variations in the microwave power level.

The output of the circuit 50 controls attenuator 44 in such a way that the 10 KHz burst signal is made equal to the microwave signal on the reference signal detector 22. The output of the 10 KHz burst modulator 40 tracks the output of the microwave oscillator independently of the temperature of the sensor.

The sensing signal loop of my system includes a 30 Hz band-pass filter receives the output from detector 30 through the bridge 34. Since this sensing signal can vary over a wide range of about 35 dbs., it is necessary to reduce the effects of stray noise and other interference under conditions of high attenuation in the surface wave guide 26. I feed the output of filter 52 to a switched gain amplifier 54 which, as will be explained hereinbelow, increases the gain of the sensing loop as the output of bridge 34 becomes smaller with increasing attenuation owing to moisture in the web of wave guide 26. The gain of the amplifier is changed in steps of 3.2 db each. I feed the output of amplifier 54 to a phase detector 56 the reference phases for which are provided by the output on channel 38 of oscillator 36 and the complement output of oscillator 36 on channel 42. The output of detector 56 is a d.c. level, the polarity of which indicates whether the microwave signal or the 10 KHz burst is greater on detector 30. The level of the output of detector 56 indicates the magnitude of the difference between the signals. I employ the detector output to operate the up-down control 58 of a decibel counter 60 to cause the counter to count up or down in step with the 10 KHz signal when it is greater or less than the microwave signal on detector 30. It will be apparent that I apply the least two significant place outputs of counter 60 to the controls of amplifier 54.

I apply the output from counter 60 to a logarithmic attenuator supplied with the output from the 10 KHz burst modulator 40. The attenuator unit 62 alters the level of the burst modulator output in accordance with the count contained in counter 60 which, as is pointed out hereinabove, tracks the output of the microwave oscillator independently of the temperature of the sensor. If the counter contains one count, for example, attenuator 62 attenuates the output of modulator 40 by exactly 0.05 db. Thus, the sensing signal loop is a precision attenuator which is accurate to within 0.05 db over the entire range from zero to 51.15 db.

The relationship between the count of counter 60 and the attenuation of the 10 KHz signal from modulator 40 provided by circuit 62 is shown below:

| Count | Attenuation (db's) |
|---|---|
| 1 | 0.05 |
| 2 | 0.10 |
| 4 | 0.20 |
| 5 | 0.25 |
| 8 | 0.40 |
| 16 | 0.80 |
| 32 | 1.60 |
| . | . |
| 1023 | 51.15 |

The output of the attenuator circuit 62 is applied to the bridge 34 associated with detector 30.

Figure 2:
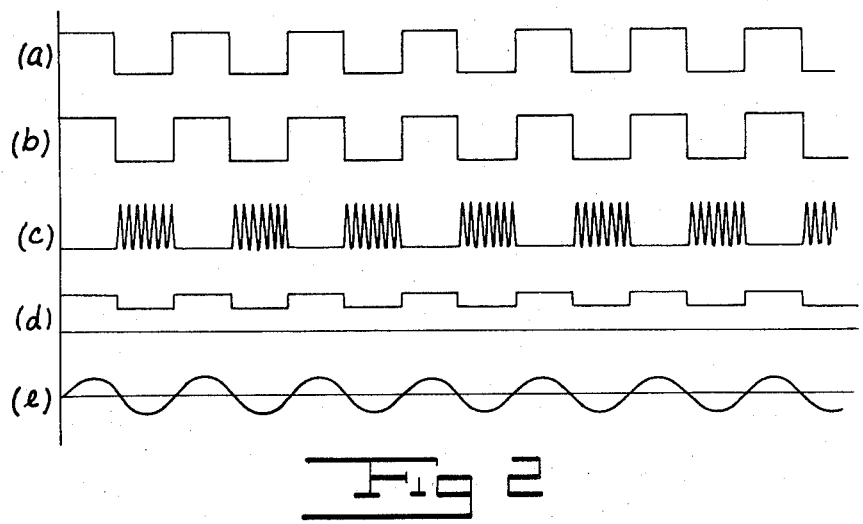
FIG. 2 is a diagrammatic view illustrating wave forms existing at various points in my microwave low moisture measuring apparatus.

Referring now to FIG. 2, I have illustrated some of the wave forms appearing at various points in the circuit of FIG. 1. Wave form (a) represents the output of oscillator 36 appearing on channel 38. The output of oscillator 16 on wave guide 18 is illustrated by wave form (b). Wave form (c) shows the output of burst modulator 40 as a result of the complement signal on channel 42. This signal is fed to the mount of each of the detectors 22 and 30 in parallel with d.c. supplied by the bridge circuits 32 and 34. It will be appreciated that the microwave signal from oscillator 16 and the 10 KHz burst are not present on either of the detectors at the same time. As has been pointed out, the purpose of each of the bridges 32 and 34 is to supply to the detectors 22 and 30 that amount of d.c. heating to the thermistors thereof which makes up the difference between heat supplied by the amount and the heat supplied by either the microwave signal or the 10 KHz burst to keep the resistance of the detector constant at 200 ohms. This is illustrated by wave form (d) showing the d.c. output of one of the bridges assuming that the 10 KHz signal is the larger and that the bridge circuit must decrease its d.c. level when the 10 KHz burst signal is on. When the bridge d.c. signal illustrated by wave form (d) is applied to a band-pass filter, the result is an a.c. signal as shown by wave form (e) which is a sinusoidal wave form the amplitude of which represents the difference between the 10 KHz burst and the microwave signal on the detector and the phase of which relative to the 30 Hz signal on channel 38 indicates which signal is less than that which will cause the detector resistance to be 200 ohms. This action is independent of temperature. Neither does it matter if the detector 22 and the detector 30 are at different temperatures.

My system includes a loop for indicating the percent of moisture in the web the moisture content of which is to be measured. Counter 60 operates a db digital-to-analog converter 64 which produces an output voltage which is a linear function of decibels. This voltage is fed through a range unit 66 whereat various paper grade selections are made. From the unit 66 the signal passes to a summing junction 68 which may merely be the common point of a number of resistors through which currents flow to the input of an operational amplifier. Functionally, there is no interaction between any two of the currents fed to the junction and the output of the amplifier is dependent upon the sum of the currents fed to the common point. Summing junction 68 controls the operation of a binary-coded-decimal counter control 70 which drives a binary-coded-decimal counter 72 to cause the counter to count up with a net negative signal at the summing junction or to count down with a net positive signal. I feed the output of the counter 72 to a non-linear digital-to-analog converter 74 which produces a positive voltage on a channel 76 which voltage is a non-linear function of the counter output. The voltage represents the relationship between decibels sensed by the wave guide sensor 26 and the percent moisture in the web 14 contacting the wave guide 26. Stated otherwise, this converter in the percent moisture versus decibel calibrator. The output on channel 76 is fed back to the junction 68 as a signal which is equal in amplitude and opposite in polarity to the signal entering junction 68 from range unit 66 as a result of the input from converter 64. When these signals balance each other, control 70 stops so that the count on counter 72 represents the percent moisture in the web. This output may be fed to a suitable display unit 96.

I also apply the output of counter 72 to a percent moisture digital-to-analog converter 77 the output of which is a d.c. signal which is a linear function of the input percent moisture signal. I apply this signal, together with the signal from a temperature sensor 79 of any suitable type known to the art and associated with web 14, to the inputs of a temperature compensation arithmetic unit 78 which determines the deviation of web temperature from 150°F and multiplies this deviation by a function of moisture percentage which has a maximum value at 10 percent, a value of 0.1 of maximum at 0.00 percent and a value of 0.75 of maximum at 15 percent. The output of network 78 is a voltage which varies about zero directly as the temperature varies about the 150° F mean between the extremes of 100°F and 200°F. I apply this output as an additional current to junction 68 to modify the percent moisture output of counter 72 as the temperature deviates from 150°F and the moisture varies between zero and 15 percent. This arrangement just described affords my system a temperature compensation loop.

If the weight of fiber in the web 14 are constant, the percent moisture readout would vary only with the amount of water per unit area of the web, since temperature variations are compensated for by the loop just described. If that were the case, the readout would provide true percent moisture information. As a practical matter, however, fiber weight varies during production and the variation must be detected and compensated for if accurate results are to be obtained. I combine the output of counter 72 with a bases weight signal on a channel 82 in a multiplier 80. The basis weight signal may be obtained by any suitable means known to the art. Since this means does not per se form part of my invention it will not be described in detail. The output of multiplier 80 appearing on a channel 84 represents moisture weight in pounds of water. That is, it is the result of a multiplication of basis weight times percent moisture per unit area to given moisture weight per unit area. It may be returned to the basis weight measuring system (not shown) for the determination of fiber weight. I also feed the water weight signal on channel 84 through an inverter 86 to an adder 88 whereat it is added to the signal on channel 82 and to an oven dry set point signal on a channel 90 leading from unit 66 to provide an output which represents fiber weight deviation from set point per unit area. This signal, together with the output of counter 72, is fed to a second nonlinear digital-to-analog converter 92 which functions to combine the two input signals to produce a linear corrective output which is compatible with the voltage function of decibels which is fed back by a channel 94 to junction 68 by way of converter 64 and unit 66. As a result the value of the signal out of the summing junction causes the system to stabilize at a new point to give the final corrected value of percent moisture.

Figure 3:
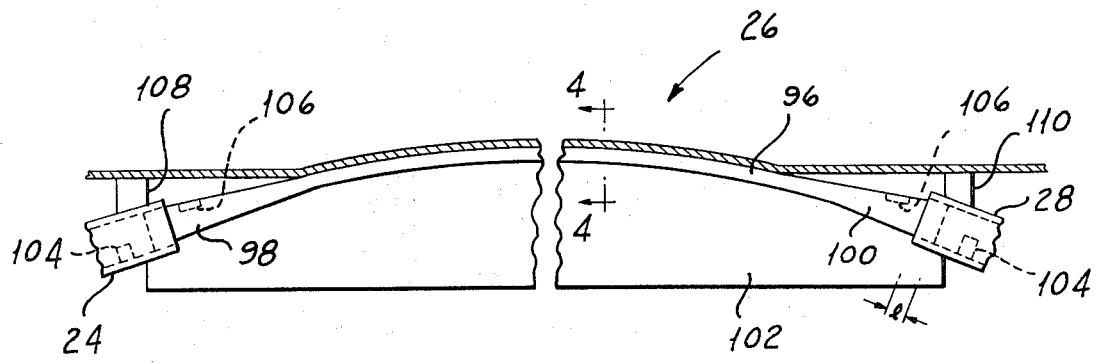
FIG. 3 is a side elevation of one form of wave guide section forming a part of my microwave low moisture content measuring apparatus illustrating the relationship of the section to the web.
Figure 4:
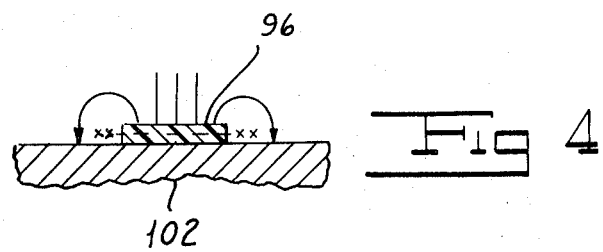
FIG. 4 is a fragmentary sectional view of the form of wave guide section illustrated in FIG. 3 and taken along the line 4—4 thereof.
Figure 5:
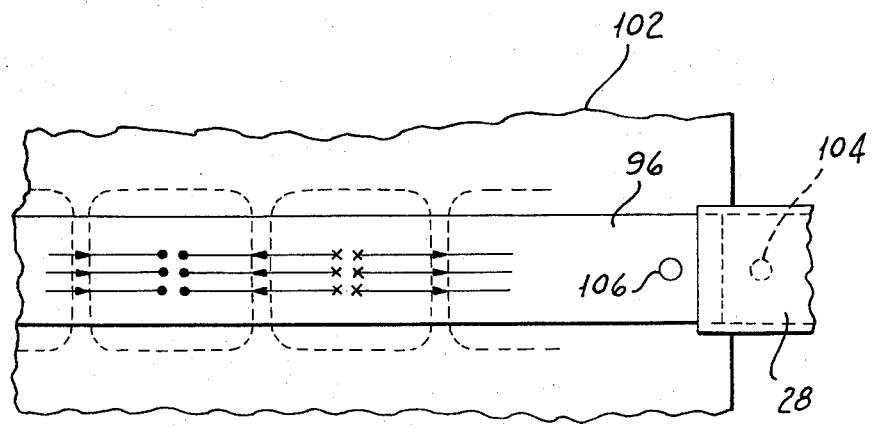
FIG. 5 is a fragmentary top plan view of the form of wave guide section illustrated in FIG. 3.
Figure 6:
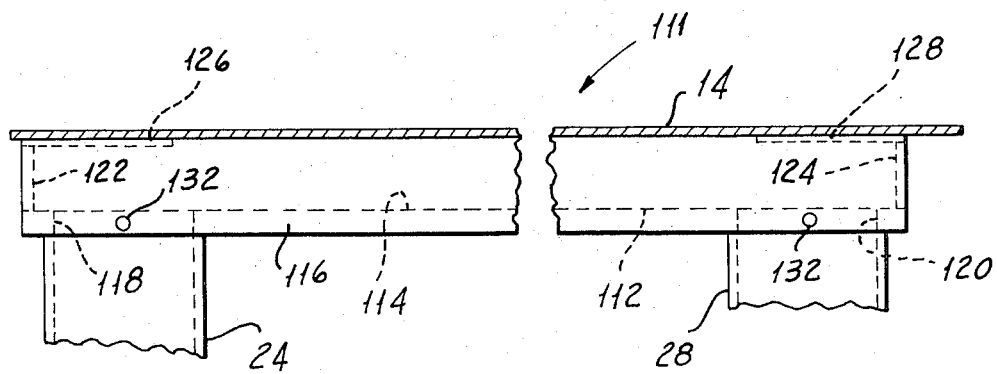
FIG. 6 is a side elevation of an alternate form of wave guide section which I employ in my microwave low moisture content measuring apparatus illustrating the relationship of the section to a web of material the moisture content of which is to be measured.

Referring now to FIGS. 3 to 5, a salient feature of my invention is the surface wave guide 26 which includes a strip 96 of dielectric material the ends of which provide transition portions 98 and 100 for coupling the strip into the ends of the rectangular input wave guide 24 and the rectangular output wave guide 28. The strip 96 in the form of my surface wave guide illustrated in FIGS. 3 to 5 is carried by a metallic support 102.

It is known that a strip of dielectric material set on a conducting surface will propagate a microwave signal. In my surface wave guide 26, so long as the strip 96 does not contact lossy material the microwave is propagated therealong without loss. When the strip 96 contacts a web of paper, the paper itself being a dielectric in effect becomes a part of the wave guide and the microwave propagates in the paper. Moisture in the web, however, attenuates the microwave signal so that the level of the output signal varies in accordance with the amount of moisture.

That the thickness of the paper has no effect on energy absorption can readily be demonstrated by laying successive sheets of paper on strip 96, taking care to leave no gaps between sheets. It will be observed that the change in signal level from input to output is the same for 50 sheets as for one sheet. This is owing to the fact that the dielectric paper becomes an intimate part of the microwave propagation path.

The energy in the wave guides 24 and 28 propagates in the well-known $TE_{10}$ mode. The impedance of the wave guide comprising the dielectric strip 96 and the surface of the conductive support 102 is matched to the impedance of the input and output wave guides 24 and 28 by the length 1 of the strip 96 which projects into each of the wave guides and by a capacitive post 104 in the wave guide. It will be appreciated that such impedance matching is necessary to ensure maximum microwave power flow from wave guide 24 to the surface wave guide 26 and from the surface wave guide 26 to the output wave guide 24. I provide a metallic disc 106 in each of the wave guide portions 98 and 100 adjacent to the wave guides 24 and 28 to enhance the mode conversion within the transition sections 98 and 100.

In a particular embodiment of my invention, the input and output wave guides 24 and 28 may have inner dimensions of 0.170 inches high by 0.420 inches wide. The portion of the strip 96 extending into each of the wave guides 24 and 28 has the same dimensions. From these end portions the vertical dimension of the strip 96 changes over the transition portions 98 and 100 to a height of 0.096 inches in the central portion which is contacted with the web 14 in a manner to be described. The locations and dimensions of post 104 and discs 106, as well as the length 1 of each of the transition sections extending into the input and output wave guides, can readily be determined for proper impedance matching. The dielectric strip 96 may be made from any suitable material. In this embodiment I have formed the strip 96 from ultra high molecular weight polyethylene.

As is known in the art, the distribution of the electric and magnetic components of the electromagnetic wave or microwave signal which is propagated along the surface wave guide 26 defines the mode of propagation. In FIGS. 4 and 5, as is conventional, I have represented the electric field components by solid lines and the magnetic field components by broken lines. Since there are both magnetic and electric field components in the direction of propagation which lies in the plane of the paper in FIGS. 3 and 5 and normal to the plane of the paper in FIG. 4, it will be clear that the propagation mode is neither pure transverse electric or pure transverse magnetic. Thus, the mode is classified as an HE mode, as distinguished from the free space TEM mode, which would radiate energy away from the surface wave guide. Since my surface wave guide does not radiate energy into free space and if no lossy material contacts the upper surface of the strip 96, no loss is experienced by the microwave signal. If, however, a web such as the web 14 of moisture-containing material contacts the surface of strip 96, the electric field components pass through the web and, since the material, such as paper, is also a dielectric, the electromagnetic field will propagate within the web. Any interaction between the web and the electric field component must be accompanied by a corresponding interaction with the magnetic component of the field. Thus, the web 14 of moisture-containing material becomes an intimate part of the wave guide 26 and the electromagnetic field propagates both in the dielectric strip 96 and in the web 14 no matter how thick is the web of moisture containing material.

In addition to the foregoing, since the web 14 is disposed along the direction of propagation of the microwave signal over the wave guide 26, the loss experienced by the signal is governed both by the total amount of water in the web and by the length of the surface wave guide 26 in contact with the web 14. From this fact, it will be seen that the sensitivity of apparatus incorporating my surface wave guide can be tailored to suit any application by simply changing the length of the surface wave guide in contact with the web. That is, increasing the length of the wave guide increases the sensitivity of the system.

In the particular embodiment of the wave guide 26 illustrated in FIGS. 3 to 5 the central section thereof between the transition portions 98 is curved or bowed so as to extend above the plane of paper guides 108 and 110. These guides prevent the web from contacting the dielectric strip in the transition sections 98 and 100.

Referring now to FIGS. 6 to 9, in an alternate embodiment of the surface wave guide indicated generally by the reference character 111, we position the dielectric strip 112 of fused quartz or ultra high molecular weight polyethylene in a slot 114 formed in a conductive support 116. The arrangement is such that the upper surface of the strip 112 is flush with the upper surface of member 116 so that the dielectric strip can be brought into intimate contact with the undersurface of the web 14. In this embodiment of my surface wave guide, the input and output rectangular wave guides 24 and 28 are connected to the member 116 at the ends of the slot 114 the base of which is provided with openings 118 and 120 leading into wave guides 24 and 28. The ends of the slot 114 may be closed by conductive plates 122 and 124. Moreover, portions of the slot 114 above the wave guides 24 and 28 may be closed by plates 126 and 128. It will be appreciated that the upper surface of the strip 112 adjacent its ends may be provided with recesses for receiving plates 126 and 128 to ensure that the surface of the strip 112 can contact the web. In addition, I provide respective pairs of capacitive posts 130 and 132 in the openings 118 and 120 leading to wave guides 24 and 26. The purpose of the structure just described is, first, to distort the $TE_{10}$ mode propagated in the rectangular wave guides to facilitate setting up the desired surface wave guide mode described hereinabove. The second purpose is to match the impedance of the surface wave guide 111 to that of the rectangular wave guides for maximum power transfer. The sections of the surface wave guide underlying the plates 126 and 128 comprises transition regions where mode conversion occurs between the $TE_{10}$ mode in each of the rectangular wave guides and the HE surface mode in the surface wave guide. Since the transition regions lie below conductive plates in this embodiment, the web may be permitted to contact the entire upper surface of the wave guide 111 without adversely affecting the operation of the transition regions. Further it will be apparent that the physical configuration of this embodiment of my invention results in a considerable saving in space as compared with the embodiment of FIGS. 3 to 5.

Figure 9:
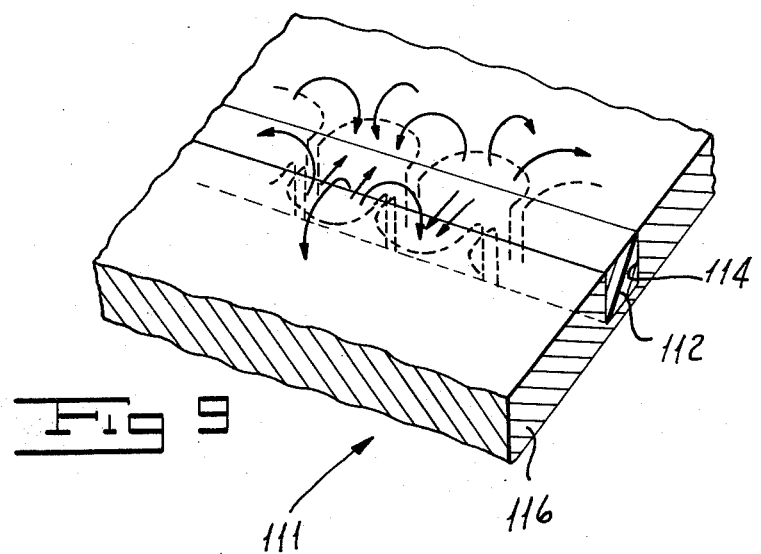
FIG. 9 is a fragmentary perspective view of the form of my wave guide section illustrated in FIG. 6 showing the propagation of the microwave therein.
Figure 8:
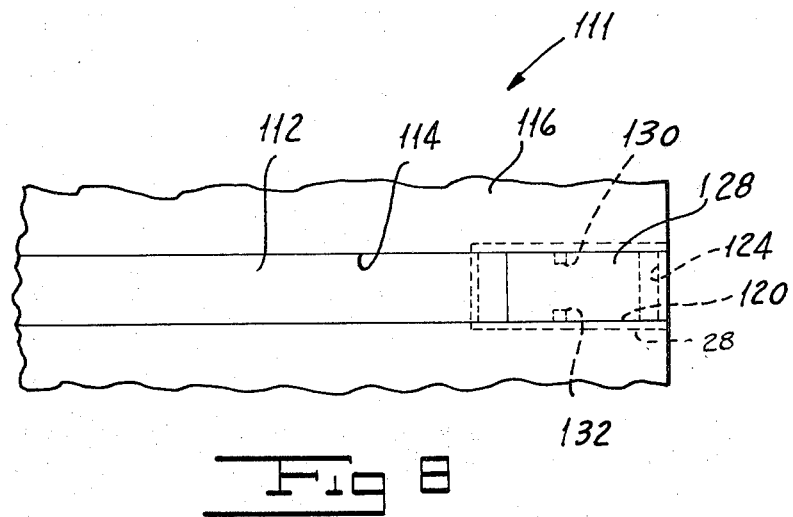
FIG. 8 is a fragmentary top plan view of the form of my wave guide section illustrated in FIG. 6.
Figure 7:
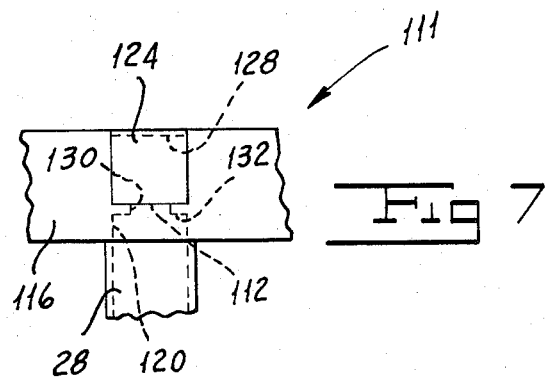
FIG. 7 is a fragmentary end elevation of the form of my wave guide section illustrated in FIG. 6.

FIG. 9 illustrates the distribution of electric and magnetic field components in the form of my invention illustrated in FIGS. 6 to 9. It will be seen that the propagation mode of this embodiment is quite similar to that of the form of my invention illustrated in FIGS. 3 to 5. Thus, the interaction between the microwave signal in the surface wave guide and the moisture in the web is the same as in the embodiment described hereinabove.

The sensitivity of a system incorporating the form of my surface wave guide illustrated in FIGS. 6 to 9 can be changed in the same way as can that of the embodiment illustrated in FIGS. 3 to 5. That is, if greater sensitivity is required to increase the ability of the apparatus to measure a smaller moisture content, it is merely necessary to increase the length of the surface wave guide in both embodiments. For example, if the apparatus is to measure from zero to 15 percent moisture content of the web at the dry end of a liner board machine, and the device is constructed according to the first embodiment 26 of the surface wave guide, the transition regions 98 and 100 would be approximately 1.4 inches long and the active regions between the transition regions and in contact with the web would be 3.5 inches long. Two such wave guides would be connected in series by coupling the wave guide 28 of one surface wave guide to a wave guide 28 of a second surface wave guide 26 located beside and parallel to the first surface wave guide and separate from the first by about 0.75 inches. In this instance, the energy is supplied to the wave guide 24 of one of the two surface wave guides 26 by the coupler 20 and the detector 30 is connected to the wave guide 24 of the second surface wave guide 26. With this arrangement, the sensitivity of the apparatus lies between $2 \times 10^{-4}$ and $1.5 \times 10^{-2}$ pounds of water per square foot. The apparatus has a very high sensitivity of 1,400 db per pound of water per square foot. In the same application, employing the form of our wave guide 111 illustrated in FIGS. 6 to 9, the length of the surface wave guide would be 7.0 inches and only one wave guide 111 would be required to achieve the same sensitivity. Any suitable means may be employed to move the head 12 across the surface of web 14.

The operation of my system for determining the moisture content in a web of dielectric material having a low moisture content such, for example, as a web of paper at the dry end of a papermaking machine will be clear from the description hereinabove. The reference signal loop to which a sample of the output of oscillator 16 is supplied by circuit 20 provides a reference signal from modulator 40 which tracks the output of the oscillator 16 independently of temperature. This signal is fed to attenuator 62 in the sensing loop which attenuates the signal in accordance with the court contained in counter 60. The microwave signal fed to the surface wave guide 26 is propagated along the length of dielectric 96 and in the paper web 14 contacted by the dielectric. In the course of its propagation through the web 14, the signal is attenuated in accordance with the amount of moisture contained therein. This signal is detected by the detector 30 and passed to the bridge 34 the output of which passes through a 30 Hz filter 52 is amplified and its phase is detected to produce an output signal from detector 56, the polarity of which output indicates whether the microwave signal or the 10 KHz burst signal is greater on detector 30. The level of this signal indicates the degree of difference between the signals. This signal controls the operation of counter 60 which controls attenuator 62 which receives the reference signal from circuit 40. Thus, the sensing loop is brought to balance.

In response to the count contained in counter 60 converter 64 produces an output which is fed to the summing junction 68 through the range unit 66 together with the temperature compensation signal from circuit 78 to cause the converter 72 to provide an output indicating the percent moisture in the web. The signal on channel 90 is fed to converter 64 to compensate for variations in fiber weight.

It will be appreciated that my system is independent of variations in output from source 16. It is compensated for variations in temperature of the web being sensed. Its operation, further, is independent of ambient temperature. The sensitivity of my system can readily be changed merely by changing the length of the dielectric strip such, for example, as strip 96. If increased sensitivity is desired the strip length can be increased.

It will be seen that I have accomplished the objects of my invention. I have provided a microwave low moisture measuring system which is especially adapted for use in measuring the moisture content at locations such as at the dry end of a papermaking machine. My system is more sensitive than are systems of the prior art. Its operation is independent of the thickness of the web. The sensitivity of my system can readily be tailored to suit a particular installation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for measuring the moisture content of a web including in combination, an elongated strip of dielectric material, means including a conductive support for positioning said strip in contact with the surface of said web, source of a microwave signal, means for applying said signal to said strip as an input thereto adjacent to one end thereof to cause said signal to be propagated along the length of said strip in contact with said surface, and means for deriving an output signal from said strip at a location therealong spaced from said one end and after interaction of said propagated signal with the moisture in said web to afford a measure of the moisture content of the web.

2. Apparatus as in claim 1 in which said web is disposed along the direction of propagation of said signal in said waveguide.

3. Apparatus as in claim 1 in which said microwave signal is propagated in said strip in an HE mode.

4. Apparatus as in claim 1 in which said elongated strip of dielectric material is embedded in said conductive support.

5. Apparatus as in claim 1 in which said elongated dielectric strip has a central web contacting portion and terminal transition portions, and means for maintaining said transition portions out of engagement with said web.

6. Apparatus as in claim 5 in which said coupling means and said detecting means comprise respective rectangular waveguides for receiving the ends of said transition portions.

7. Apparatus as in claim 1 in which said support of conductive material has a slot therein and said strip of dielectric material is in said slot, said slot being formed with respective openings in the base thereof adjacent the ends thereof, said coupling means comprising a first waveguide leading into one of said openings, said detecting means comprising a second waveguide leading into the other opening.

8. Apparatus for measuring the moisture content of a web including in combination, an elongated strip of dielectric material, means including a conductive support for positioning said strip in contact with the surface of said web, a source of a microwave signal, means for applying said signal to said strip as an input thereto adjacent to one end thereof to cause said signal to be propagated along the length of said strip in contact with said surface, means for producing a reference signal affording a measure of the power level of said source, means for deriving an output signal from said strip at a location therealong spaced from said one end and after interaction of said propagated signal with the moisture in said web, and means responsive to said output and to said reference signal for producing a measure of the moisture content of said web.

9. Apparatus as in claim 8 in which said source of microwave signal comprises means for switching said signal on and off at a rate less than about 100 Hz.

10. Apparatus as in claim 8 in which said output signal deriving means comprises a thermistor, and a waveguide mount for said thermistor, said apparatus including means for maintaining the temperature of said thermistor substantially constant.

11. Apparatus as in claim 10 in which said reference signal comprises burst of an alternating current signal of a frequency appreciably less than that of said microwave signal, said apparatus including means for alternately applying said bursts and said microwave signal to said thermistor.

12. Apparatus as in claim 8 in which said means responsive to said output signal and to said reference signal comprises means for producing a control signal the phase of which relative to the reference signal indicates the relative magnitude of the microwave and reference signals.

* * * * *